United States Patent [19]

Schmidt, deceased et al.

[11] 3,819,578

[45] June 25, 1974

[54] PRODUCTION OF MUCONODINITRILE

[75] Inventors: Gerhard J. M. Schmidt, deceased, late of Rehonst, Israel by Esther Schmidt, legal representative; Joseph Shabtai, Rehovot; Amiram Hirshfeld, Petah-Tiqua, both of Israel

[73] Assignee: Yeda Research and Development Co., Ltd., Rehovot, Israel

[22] Filed: Sept. 9, 1971

[21] Appl. No.: 179,209

[30] Foreign Application Priority Data
Sept. 17, 1970  Israel.................................... 35306

[52] U.S. Cl.......................................... 260/465.8 R
[51] Int. Cl........................................... C07c 121/02
[58] Field of Search........ 260/465.8 R, 465.9, 465.3

[56] References Cited
UNITED STATES PATENTS

| | | | |
|---|---|---|---|
| 3,248,340 | 4/1966 | Callahan et al. | 260/465.3 X |
| 3,445,521 | 5/1969 | Callahan et al. | 260/465.3 X |
| 3,466,318 | 9/1969 | Lambert et al. | 260/465.9 |
| 3,542,842 | 11/1970 | Grasselli et al. | 260/465.3 |
| 3,579,559 | 5/1971 | Unger | 260/465.8 R |

*Primary Examiner*—Joseph P. Brust
*Attorney, Agent, or Firm*—Ostrolenk, Faber, Gerb & Soffen

[57] ABSTRACT

A high yield (92–95 percent) catalytic process for the production of muconodinitrile (1,4-dicyano-1,3-butadiene) by oxidative vapor phase dehydrogenation of 1,4-dicyanobutenes has been developed. The process is applicable to each of the following starting materials: (a) 1,4-dicyano-1-butene, (b) 1,4-dicyano-2-butene, and (c) a mixture of the last two isomers. The preferred catalysts used are supported bismuth phosphomolybdate or bismuth molybdate systems and the range of operating temperature is between 350–580° C. An important feature of the process is that it involves passing the starting material over the catalyst in admixture with a desorbent, in particular, benzene, which does not participate in the reaction but prevents side reactions of the muconodinitrile formed. The isomeric composition of the muconodinitrile depends on the particular starting material and on the reaction conditions.

8 Claims, No Drawings

PRODUCTION OF MUCONODINITRILE

BACKGROUND OF THE INVENTION

1. Field of the Invention

The present invention relates to the vapor phase catalytic dehydrogenation of 1,4-dicyanobutene to produce muconodinitrile (1,4-dicyano-1,3-butadiene).

2. Description of the Prior Art

Muconodinitrile (1,4-dicyano-1,3-butadiene) can be prepared on a small scale by several procedures. A mixture of the three geometric isomers of muconodinitrile is obtained by treating 2,3-dichloro-1,4-dicyanobutane, or the corresponding dibromo compound, with sodium acetate according to H. F. Piepenbrink, Ann., 572, 83 (1961). According to J. H. Hall et al., J.A.C.S 89, 5836 (1967) the thermal decomposition of 1,2-diazidobenzene yields selectively cis,cis-muconodinitrile. According to G. M. J. Schmidt, Israel Pat. App. No. 31872 gaseous bromine is added to solid 1,4-dicyano-2-butene to yield 2,3-dibromo-1,4-dicyanobutane, which latter is converted by dehydrobromination in the solid state with gaseous ammonia to muconodinitrile.

The dehydrogenation of mononitriles is known, as for example the conversion of propionitrile to acrylonitrile (Jap. Pat. No. 69 15,765), or the conversion of 1-cyano-2-butene to 1-cyano-1,3-butadiene in the presence of a phosphomolybdate catalyst (U.K. Pat. No. 1040308). As 1,4-dicyano-1-butene and also 1,4-dicyano-2-butene are available commercially, a catalytic process of these to muconodinitrile is especially attractive. According to the invention there is provided for the first time a direct catalytic dehydrogenation process for the production of the desired product.

DESCRIPTION OF THE INVENTION

This invention relates to the manufacture of muconodinitrile (1,4-dicyano-1,3-butadiene), which usually consists of a mixture of the three possible geometric isomers, i.e. cis,cis-muconodinitrile, cis-trans-muconodinitrile, and trans,trans-muconodinitrile. The invention provides a simple and convenient process for production of muconodinitrile by vapor-phase oxidative dehydrogenation of 1,4-dicyanobutenes at elevated temperature and in the presence of a suitable catalyst.

The oxidative dehydrogenation process described in this invention is applicable to each of the following readily available starting materials: (a) 1,4-dicyano-1-butene, (b) 1,4-dicyano-2-butene, and (c) a mixture of the last two isomers. 1,4-Dicyano-1-butene and 1,4-dicyano-2-butene, used as starting materials either separately or in the form of a mixture, may each be composed either of the pure cis- or of the pure trans- isomer or of a mixture of cis- and trans-isomers. The muconodinitrile produced from 1,4-dicyano-1-butene, or 1,4-dicyano-2-butene, or a mixture of these two isomers, is essentially free of by-products under the operational conditions of this process.

The conversion of 1,4-dicyanobutene to muconodinitrile is accomplished in the presence of a catalyst system which may belong to a group of catalysts known from the art to be suitable for effecting vapor-phase oxidative dehydrogenations. Particularly useful for the purposes of this invention are bismuth phosphomolybdate and bismuth molybdate catalysts in which the bismuth/molybdenum ratio is 0.8 to 1.0. The catalyst is usually supported on a carrier material, preferably silica. The preparation of the supported catalyst system may be performed by a variety of procedures which are known from the art. For example, the catalyst may be prepared by co-gelling of the various components, preferably in the presence of silicic acid, or an aqueous colloidal silical sol, and then dried, calcined at 530°–600°C and subsequently ground to an appropriate particle size. The catalyst may be employed in admixture with an inert diluent, e.g. quartz chips or Pyrex glass helices. Preferably, the catalyst may be used in a pelletized form, or in the form of spheres, or in other convenient small particle forms as known in the art.

The process of the invention may be carried out in any apparatus of the type suitable for vapor-phase oxidative dehydrogenation. For instance, the dehydrogenation may be performed in a flow system equipped with reactor and designed for either continuous or intermittent operation. The catalyst bed employed in the process may be either a fixed bed or a fluidized bed. Although the catalyst may be continuously regenerated by operation under air, it may be desirable to employ independent periodic reactivation of the catalyst bed by contact with air at 500° to 600°C. The 1,4-dicyanobutene, preferably dissolved in a solvent such as benzene, may be introduced into the reactor in admixture with a carrier gas, preferably air. The 1,4-dicyanobutene solution is vaporized and contacted with the catalyst which is maintained at an elevated temperature. The benzene may play an important role in desorbing the muconodinitrile produced and in preventing side reactions.

Temperatures within the range of 350° to 600°C may be employed in the process, but temperatures between 450° to 580°C are preferred.

The process is usually conducted at about atmospheric pressure, but slightly lower or higher pressures may be used. The apparent contact time employed in the process, i.e. the length of time a unit volume of vaporized 1,4-dicyanobutene is in contact with an apparent unit volume of catalyst at a given temperature, may vary in the range of 0.1 to 60 seconds. The optimal contact time depends on the operating temperature. For example, in the vicinity of 550° a contact time of 2 to 10 sec. is necessary for high conversion of the starting material.

The isomeric composition of muconodinitrile produced by the process of our invention depends to some extent on the nature of the starting material, and apparently, also on the operating temperature and the contact time. For example, at temperatures in the range of 510° to 570° and contact times between 2 to 10 sec. the concentrations of the three isomeric components of muconodinitrile obtained from 1,4-dicyano-1-butene vary within the following limits: cis,cis-muconodinitrile 40-55, cis,trans- muconodinitrile 20-35, and trans,trans- muconodinitrile 20–30 percent. In the same ranges of operating conditions, the distribution of the isomeric components of muconodinitrile produced from 1,4-dicyano-2-butene varies within the following limits: cis,cis-isomer 50-70, cis,trans-isomer 15-25, and trans,trans-isomer 15-28%.

The three geometric isomers of muconodinitrile are separable by fractional crystallization, chromatography, and other methods known from the art. Therefore, the method of our invention provides a convenient method for preparation of each of the three geometric isomers of muconodinitrile, i.e. cis,cis-muconodinitrile, cis,trans-muconodinitrile, and trans,trans-muconodinitrile.

Muconodinitrile is a potentially useful starting material for polymerization and copolymerization processes.

The invention is illustrated in the following Examples.

EXAMPLE 1

A batch of powdered bismuth phosphomolybdate on silica catalyst was pre-activated at 600° under air. The catalyst was then diluted with Pyrex helices, transferred to a reactor and heated to 550°. A 15 percent solution of 1,4-dicyano-1-butene in benzene was introduced in the reactor at a constant rate, in admixture with a constant flow of air. The molar ratio of oxygen to 1,4-dicyano-1-butene maintained throughout the process was about 2:1 and the operating pressure was approximately atmospheric. The apparent contact time was 2 sec. The 1,4-dicyano-1-butene was converted to the extent of 75 percent and the yield of muconodinitrile based on converted starting material was 95 percent.

The muconodinitrile produced was composed of cis,cis-muconodinitrile 51.2 percent, cis,trans-muconodinitrile 23.8 percent, and trans,trans-muconodinitrile 25.0 percent, as determined by gas chromatography on a 2m × 3mm (i.d.) column filled with 5 percent butandiol succinate on 40–60 mesh Chromosorb W. The nmr spectrum of the product [$CDCl_3$, $\delta$ 5.5–6.1 (m,2), 6.7–7.7 (m,2)] was identical with that of a sample of muconodinitrile prepared by independent means.

EXAMPLE 2

The catalyst, consisting of powdered bismuth phosphomolybdate on silica, was pre-activated at 600° under air and then diluted with Pyrex helices and heated in a reactor to 550°. A solution of 1,4-dicyano-2-butene in benzene was introduced at a constant rate in the reactor under a constant flow of air. A 1:1 molar ratio of oxygen to 1,4-dicyano-2-butene was maintained throughout the process, and the contact time employed was 4 sec. The operating pressure was about atmospheric. The conversion of 1,4-dicyano-2-butene was 86 percent and the yield of muconodinitrile based on converted starting material was 94 percent. The isomeric composition of the muconodinitrile was as follows: cis,cis-muconodinitrile 65 percent, cis,trans-muconodinitrile 20 percent, and trans,trans-muconodinitrile 15 percent.

EXAMPLE 3

A sample of powdered bismuth phosphomolybdate on silica catalyst was pre-activated at 600° under air and then mixed with quartz chips and heated in a reactor to 550°. A benzene solution of 1,4-dicyano-1-butene was introduced in the reactor under a constant flow of nitrogen. The apparent contact time employed was 6 sec. The conversion of 1,4-dicyano-1-butene was 84 percent and the yield of muconodinitrile based on converted starting material was 95 percent. The product consisted of cis,cis-muconodinitrile 50.5 percent, cis-trans-muconodinitrile 20 percent, trans,trans-muconodinitrile 24.5, and by-products 5 percent.

EXAMPLE 4

The catalyst, consisting of pelletized bismuth phosphomolybdate on silica, was pre-activated at 550° under a flow of air and then heated in a reactor to 570°. A solution of 1,4-dicyano-1-butene was introduced into the reactor in admixture with air at a relative rate corresponding to a 1.5:1 molar ratio of oxygen to 1,4-dicyano-1-butene throughout the process. The apparent contact time used was 3 sec. The operating pressure was about atmospheric. The conversion of 1,4-dicyano-1-butene was 84 percent and the yield of muconodinitrile based on converted starting material was 93 percent. The isomeric composition of the muconodinitrile produced was as follows: cis,cis-isomer 47.2 percent, cis,trans-isomer 31.5 percent, and trans,trans-isomer, 21.3 percent.

EXAMPLE 5

The pelletized bismuth phosphomolybdate on silica catalyst used in Example 4 was regenerated in situ by heating for 4 hrs. at 580° under a flow of air. The temperature was then lowered to 530° and a benzene solution of 1,4-dicyano-2-butene was introduced at a constant rate into the reactor, in admixture with air. A 1.5:1 molar ratio of oxygen to 1,4-dicyano-2-butene was maintained throughout the process and the apparent contact time employed was 4 sec. The conversion of 1,4-dicyano-2-butene was 89 percent and the yield of muconodinitrile based on converted starting material was 94 percent. The isomeric composition of the product was as follows: cis,cis-muconodinitrile 50.3 percent, cis,trans-muconodinitrile 23.1 percent, and trans,trans-muconodinitrile 25.6 percent.

EXAMPLE 6

The catalyst used in Example 5 was reactivated for 2 hrs. at 550° under air and then heated in a reactor at 510°. An equimolar mixture of 1,4-dicyano-1-butene and 1,4-dicyano-2-butene was dissolved in benzene and introduced into the reactor at a constant rate in admixture with air. A 1.8:1 molar ratio of oxygen to 1,4-dicyanobutene was maintained throughout the process and the apparent contact time used was 3 sec. The conversion of the 1,4-dicyanobutenes was 85 percent and the yield of muconodinitrile based on converted starting material was 92 percent. The isomeric composition of the muconodinitrile produced was as follows: cis,cis-isomer 48.6 percent, cis,trans-isomer 30.4 percent, and trans,trans-isomer 21.1 percent.

We claim:

1. A process for the production of muconodinitrile (1,4-dicyano-1,3-butadiene) which consists essentially of contacting gaseous 1,4-dicyanobutene with a catalyst selected from the group consisting of bismuth phosphomolybdate and bismuth molybdate at a temperature in the range of from 350°–600° C. and for an apparent contact time of 0.1–60 seconds, said catalyst in admixture with benzene as a desorbing agent.

2. The process of claim 1 wherein the temperature is 450°–580° C.

3. The process of claim 1 wherein the 1,4-dicyanobutene is in admixture with air.

4. The process of claim 1 wherein the catalyst has a bismuth to molybdenum ratio of 0.8 to 1.

5. The process of claim 1 wherein the 1,4-dicyanobutene is in admixture with air and with benzene as a desorbing agent, wherein the temperature is 450°–580° C. and wherein the catalyst has a bismuth to molybdenum ratio of 0.8 to 1.0.

6. The process of claim 1 wherein the 1,4-dicyanobutene is 1,4-dicyano-1-butene.

7. The process of claim 1 wherein the 1,4-dicyanobutene is 1,4-dicyano-2-butene.

8. The process of claim 1 wherein the 1,4-dicyanobutene is a mixture of 1,4-dicyano-1-butene and 1,4-dicyano-2-butene.

* * * * *